United States Patent
Bostrom

[15] 3,695,373
[45] Oct. 3, 1972

[54] WHEEL-SUPPORTED TRANSPORT VEHICLE HAVING MAXIMUM PERMITTED AXEL PRESSURE AND BEING ADAPTED TO TRANSPORT SIMULTANEOUSLY LOADS OF THEORETICALLY UNLIMITED TOTAL WEIGHT

[72] Inventor: Karl-Johan Bostrom, Boliden, Sweden

[73] Assignee: Boliden Aktiebolag, Stockholm, Sweden

[22] Filed: March 23, 1970

[21] Appl. No.: 21,911

[30] Foreign Application Priority Data

March 27, 1969 Sweden .....................4334/69

[52] U.S. Cl. .............................180/14 A, 74/356
[51] Int. Cl. ...............................B62d 59/04
[58] Field of Search ....180/14, 77; 74/335, 336, 345, 74/346, 745, 473

[56] References Cited

UNITED STATES PATENTS

| | | |
|---|---|---|
| 3,093,008 | 6/1963 | Wight .....................180/14 X |
| 2,161,153 | 6/1939 | Gallun et al. ................180/14 |
| 2,326,911 | 8/1943 | Aikman et al. .............192/.01 |
| 2,931,237 | 4/1960 | Backus .....................74/346 X |
| 3,058,364 | 10/1962 | Alferieri ..................74/346 X |
| 3,255,837 | 6/1966 | Wolf............................180/14 |

Primary Examiner—Kenneth H. Betts
Attorney—Stevens, Davis, Miller & Mosher

[57] ABSTRACT

A wheel-supported transport vehicle which is capable of transporting loads of theoretically unlimited total weight. The vehicle comprises a manned vehicle unit, which embodies a master power unit and master gear transmission system, and a number of unmanned vehicle units, each having its own respective power unit and gear transmission system. The vehicle units are coupled together in a special manner to form a train of said units. The manned vehicle unit is provided with a master operating system, pneumatic circuitry and electrical relay system, which in combination with similar systems and circuits in the unmanned units cause the gear positions selected in the manned unit to be copied contemporaneously in the gear systems of the unmanned units and by which all gears are selected with the same force.

13 Claims, 9 Drawing Figures

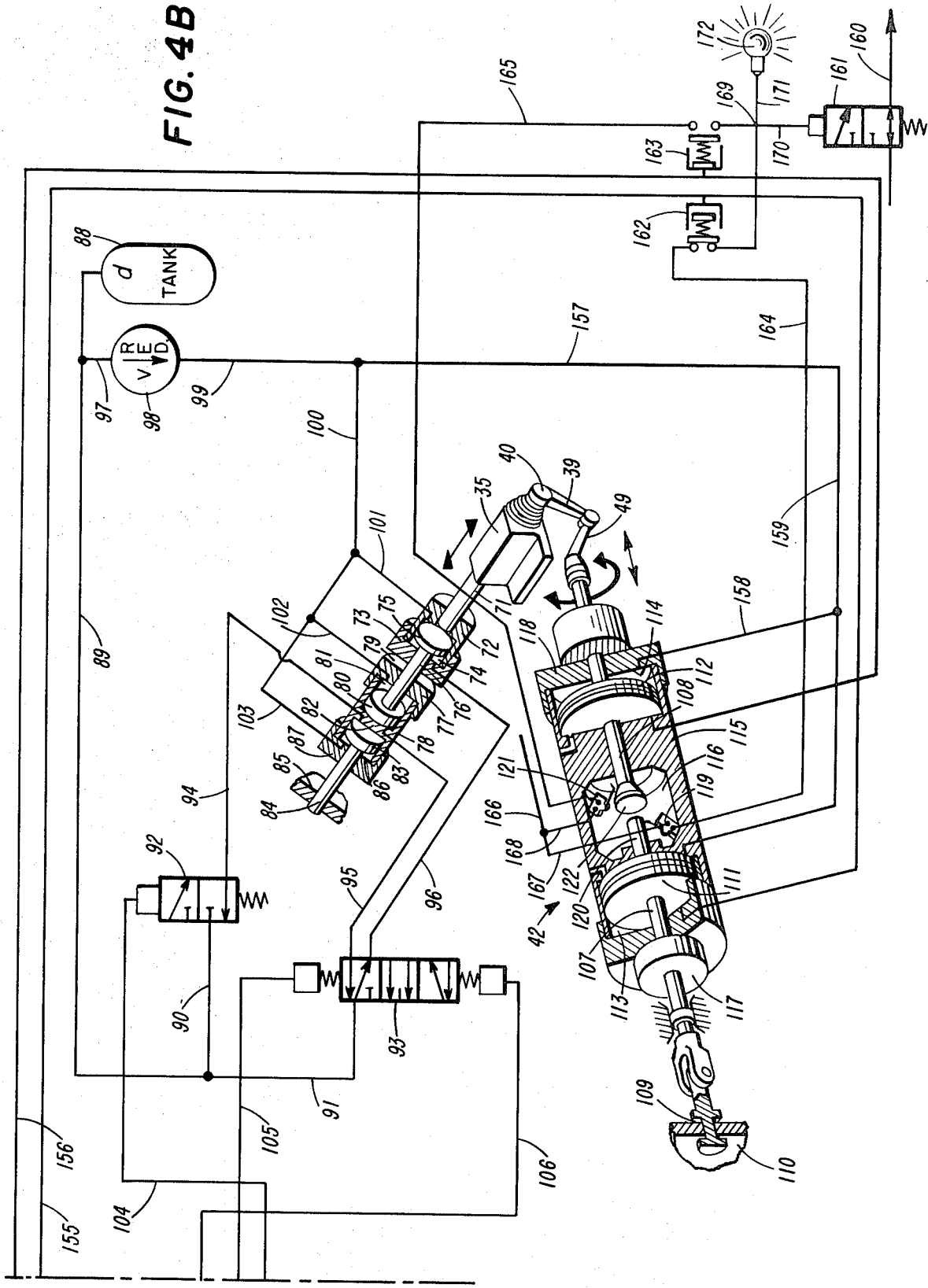

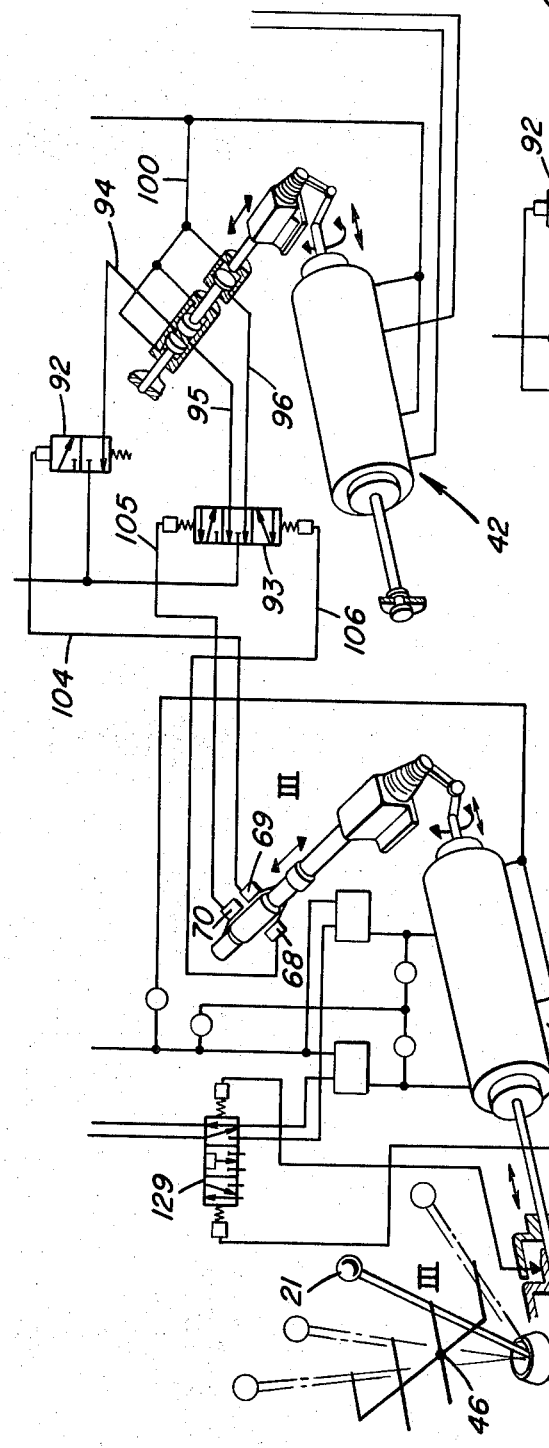
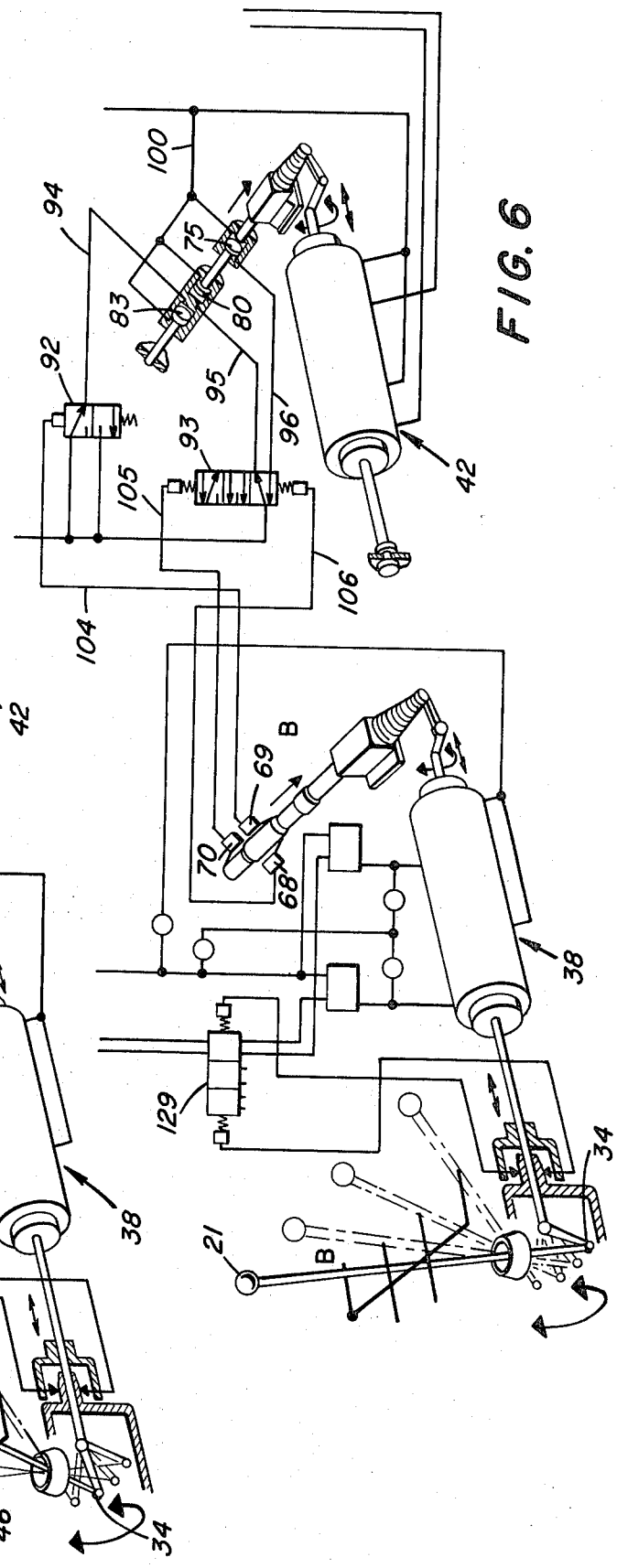
FIG. 5
FIG. 6

WHEEL-SUPPORTED TRANSPORT VEHICLE HAVING MAXIMUM PERMITTED AXEL PRESSURE AND BEING ADAPTED TO TRANSPORT SIMULTANEOUSLY LOADS OF THEORETICALLY UNLIMITED TOTAL WEIGHT

The present invention relates to a wheel-supported transport vehicle having maximum permitted axle weight limits and being adapted to transport loads of theoretically unlimited total weight, the vehicle being of the type which presents a number of load receiving units coupled together to form a train of such units, each of which is driven by at least one internal combustion engine and each engine having an individual associated gear box which in turn has an associated gear change fork and, in relevant cases, gear disengaging means, and in which the train is controlled from a manned unit located in the front portion of the train.

The successively increasing demand for transport vehicles with higher load-carrying capacities, both with respect to vehicles which run on rails and those which are adapted for road transport, has given rise to many different problems which must be resolved before loads of theoretically unlimited total weight can be transported safely and within the law. If it is desired to increase the capacity of an individual transport vehicle so that extremely heavy loads can be transported, it is necessary not only to extend the vehicle lengthwise but also to make it wider, so as not to render the vehicle unstable. Normal roads of today, however, do not permit to the extent envisaged. It is therefore necessary as a first alternative to attempt to divide the vehicle longitudinally into a number of load-carrying units — each being given a considerable load-carrying capacity — and to pivotally couple the units together, to form a long train.

Troublesome restrictions in construction which must be overcome if the designer is to limit himself to only one, individual transport vehicle are caused, however, by national regulations prohibiting axle and wheel weight limits from exceeding set maximum values. Among other things, in order to construct a vehicle which conforms to the law regarding axle weight limits it would be necessary to provide the vehicle with more wheel axles than is otherwise warranted, in order that the total weight of the load - divided over these axles — does not cause the weight on any one wheel axle to exceed the maximum permitted limits. For this reason the first alternative is unsatisfactory, other than in special circumstances.

If, on the other hand, the method is employed of coupling together an unlimited number of trailer vehicles, each having a high load capacity, to form a train, it is naturally possible to retain the total width of the transport vehicle within permitted limits and, at the same time, provided each vehicle unit with a reasonable number of wheels and wheel-axles which are not loaded in excess of the permitted limits.

When operating such a train, however, particularly high requirements are placed on the maneuverability of the train and on the drive means employed to power the train as a whole, these requirements increasing with the increasing number of units forming the train. Consequently, it is hardly feasible that one single traction or propelling vehicle or one single driving engine can be used to power a train composed of a large number of units, while the remaining units are simply left in the form of towed vehicle units. Among other things, this would require a particularly bulky prime mover and difficulty controlled power transmission between the driving vehicle and the road, giving rise to a large number of construction difficulties.

In order to avoid these disadvantages, it has been proposed — in those instances when internal combustion engines are used as the power units - to provide each of the vehicle units in the train with at least one internal combustion engine, so that although the units are coupled together in larger or smaller numbers to form a train, each unit is in fact self powered. Apart from the fact that, with such a train, it must be possible to brake the vehicle and to disengage the clutch in all engine plants simultaneously and coordinately there is still a larger problem to be met, namely that it must also be possible to change gear in all engine units simultaneously and in a coordinated manner and with the same force throughout the whole gear-changing sequence, i.e., normally the force exerted to shift the gear-change fork in all engine units.

These and other related problems, however, are solved by means of the present invention, which has the gear-change fork in the manned vehicle unit of the train is coordinated with the gear-change forks in every subsequent vehicle unit by means of an operating system which is controlled in dependence upon the position of the gear-change fork in the manned vehicle unit and in dependence upon the force with which this gear-change fork is at the moment actuated, and in that the operating system is adapted to copy contemporaneously the setting of and the force applied to the gear-change fork in the manned unit on the gear-change forks in the remaining units, so that the same transmission ratio is constantly maintained throughout the whole train.

With a preferred embodiment of the transport vehicle of the present invention, in which the gear-change fork in each vehicle unit can be moved between positions situated opposite the different gear positions and can be turned from these positions to take up respective gear engaging positions through the mediation of a shaft which is adapted to carry out translatory and rotary movements and which has a lever arm securely attached thereto. The gear lever in the manned unit and said lever arm are each pivotally connected together by a link means via an operating arm which forms an angle to the link means, the link means is divided in the cross direction to form individual parts which are adapted to rotate together but which are mutually displaced axially in relation to each other. Enclosed cushions of pressure medium are arranged to cooperate with the said parts of the link means, said cushions of pressure medium, depending on the position of displacement of the link means, serving alternately as movement and force transmission means between the said parts of the link means and being adapted to move simultaneously, via the operating system and by means of the pressure which they exert, the gear-change forks in subsequent units into the gear engaging positions and with the same force as that applied when inserting the gear-change fork in the manned unit, and wherein the gear-change fork in the manned unit is coordinated with a sensing means which senses said positions and which controls corresponding actuating means for copying the positional setting of the gear-change fork in the manned unit on the gear-change forks of the subsequent units.

The invention will now be described in detail with reference to an embodiment thereof illustrated in the accompanying drawing, further characteristic features of the invention being disclosed in conjunction therewith.

FIG. 1 shows in perspective a transport vehicle constructed in accordance with the invention, although for the sake of simplicity only two vehicle units are shown connected together to form a train. Each of the vehicle units is powered by an internal combustion engine and the gear transmission systems of the engines are connected together by means of an operating system which copies the movements carried out when changing gear in the manned unit on the gear transmission system of subsequent units.

FIG. 2 shows diagrammatically, in perspective and in slightly larger scale, the internal combustion motor of the manned unit and a gear transmission system with component parts of an initiating means constructed in accordance with the invention and adapted to operate all gears in subsequent vehicle units simultaneously and with the same force.

FIG. 3 shows in perspective, and in a slightly smaller scale than that used in FIG. 2, an internal combustion engine, intended for use in unmanned units and being of exactly the same construction and capacity as the engine used in the manned unit, the engine being provided with a movement copying means actuatable by said operating system and adapted to copy the gear-change sequence in the manned vehicle unit on the gear transmission system of the unmanned vehicle units.

FIG. 4 A and B are a perspective views, showing partially diagrammatically the aforementioned initiating and movement copying units connected together by connection circuits in the operating system of the invention required to copy the gear-change movements of the manned unit on the gear system of the next following unit, the Figure showing the positions of the different elements when the gear lever of the manned unit is fully inserted in the first-gear position.

FIG. 5 shows essentially the same layout as FIG. 4 but with the different elements in the positions which they occupy when the gear lever is moved into the third-gear position.

FIG. 6 shows the same layout as FIG. 5 with the gear lever in the reverse-gear position.

Figure 1:
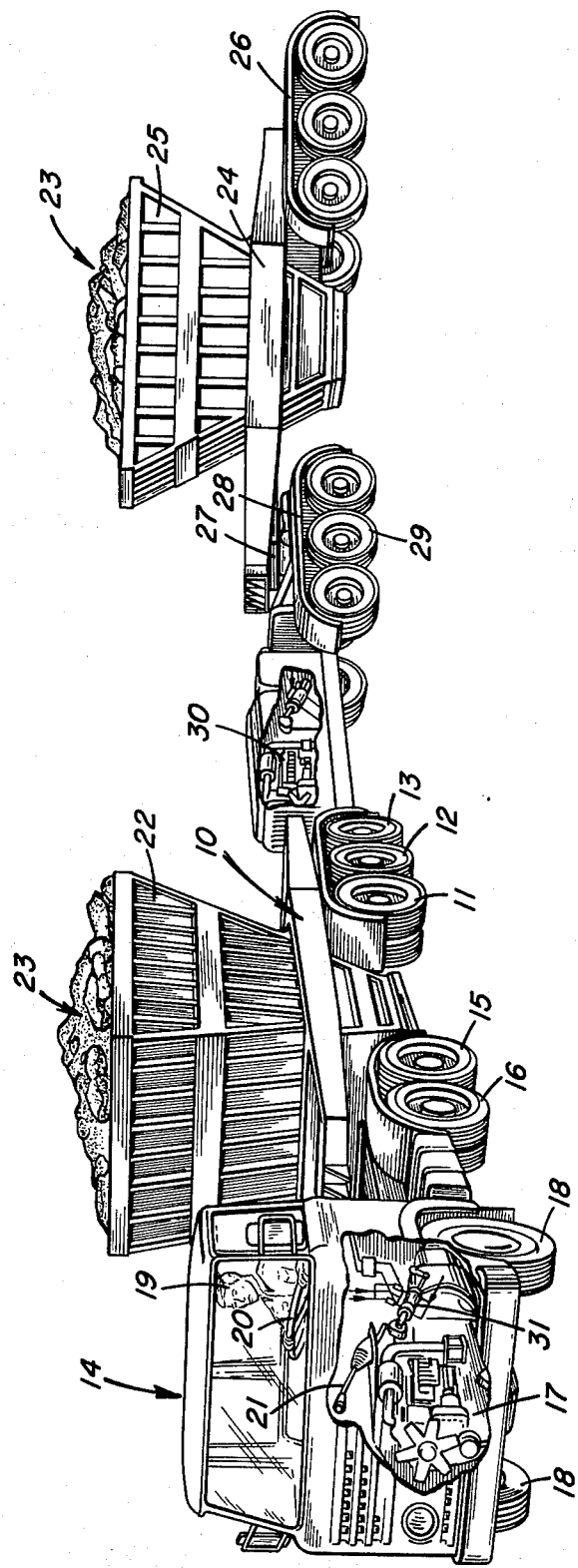

With particular reference to FIG. 1, the reference numeral 10 indicates generally a transport vehicle unit, the rear portion of which rests on a number of normally free-running support wheels 11, 12 and 13. The forward portion of the unit rests, via a known pivot table or like structure, on a driving cab 14, hereinafter called the manned unit, the rear wheels 15 of which are free-running while adjacent wheels 16 are driven by the internal combustion engine 17 of the manned unit 14; the unit 14, which is essentially in the form of a conventional truck, resting at its forward portion on non-driven guide wheels 18, which are steered by the driver 19 in a normal manner by a wheel 20, the manned unit is also provided in a known manner with a manually actuatable gear lever 21.

In the illustrative embodiment, the front transport vehicle unit of the train carries a load container 22, filled for example with ore generally indicated at 23. A second transport vehicle unit 24 is coupled behind the front unit and carries a load container 25 carrying a load 23. The rear portion of the unit 24 rests on a three-axle bogie 26 of the same construction as the rear wheel group 11, 12, 13 on the unit 10. The forward end of the unit 24 rests, via a swivel 27, on a three-axle bogie 28, the intermediate wheel group 29 of which is driven by a drive connection coacting with an internal combustion engine 30, which is positioned forwardly of the bogie 28 and carried thereby, the forward end of the engine 30 resting on the front unit 10 and being pivotally connected thereto.

For reasons of space the Figure only shows two vehicle units, although it should be understood that a larger number of units 24 with engine 30 can be coupled together to form a long train. Each transport unit 10, 24 etc. is, in accordance with the invention, individually powered by a separate internal combustion engine, all engines being operated from the cab of the manned unit 14 by a common brake system and optionally a common declutching means, common power regulating means and an initiating means generally indicated at 31 for copying the gear-change movements made in the manned unit on the gear-change systems of subsequent engines.

Figure 2:
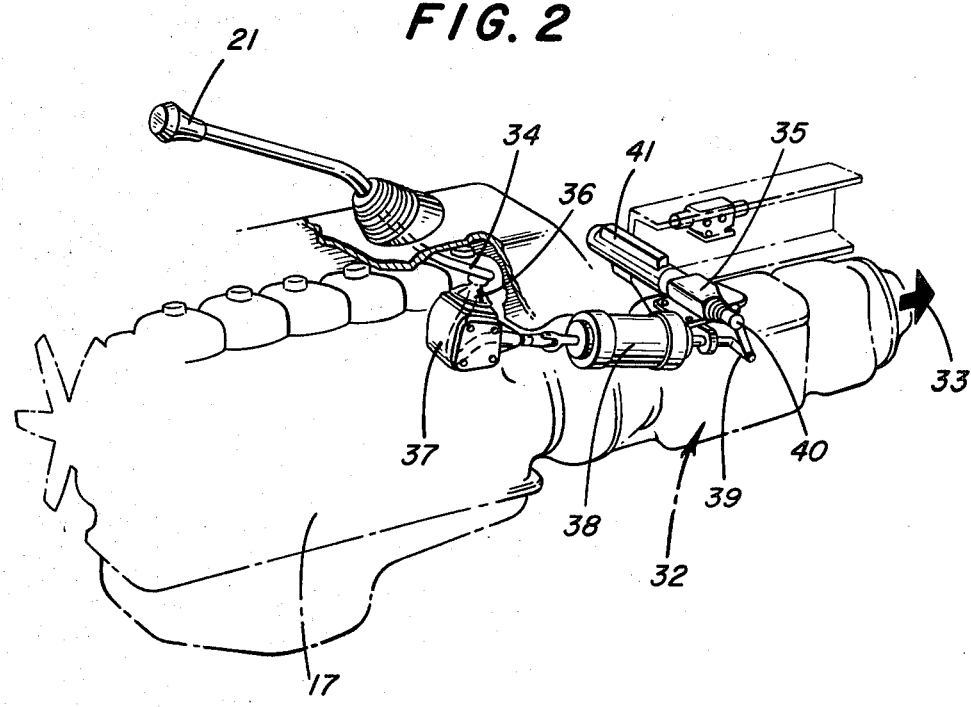

The more important elements of the subject of the present invention, are shown in FIG. 2, which illustrates in perspective, and in a slightly larger scale than FIG. 1, the internal combustion engine 17 of the manned unit. The engine 17 has a conventional gear box, which is generally indicated at 32 but not shown in detail, having gears from which protrudes an output shaft 33. The reference numeral 34 identifies the connecting shaft or rod of the gear lever 21 located in the driving cab (FIG. 1), while the reference numeral 35 identifies a conventional gear-change fork housing associated with the gear box 32. The gear shift lever 21, 34 actuates in a known manner, via ball joint means 36, an angular lever which is capable of moving within a small housing 37 and which is connected with a link means 38. The link means is the most important feature of the invention, since the sequence by which the gear-change movements and gear-change forces initiated in the gear system of the manned unit are copied on the gear systems of subsequent vehicle units is initiated here. The link means 38 is connected in turn by a lever 39 to a shaft 40, adapted to carry out translatory and rotary movements. The reference numeral 41 identifies a further housing which contains means suitable for sensing the different positions to which the shaft 40 is moved, more specifically those positions which correspond to the stations occupied by the gear-change fork, opposite the actual gear engaging positions, before said gear-change fork is turned to take up these latter positions.

Figure 3:
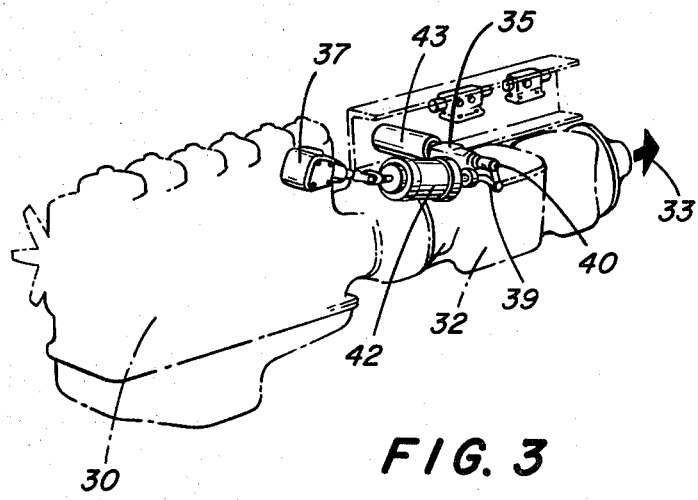

FIG. 3 illustrates in perspective the internal combustion engine 30 (FIG. 1) which powers the transport vehicle units 24. The Figure shows a gear box 32, an output shaft 33, a gear-change fork housing 35, a gear-change fork shaft 40, its lever arm 39 and a link means 42 which is slightly modified in comparison with the link means 38 of engine 17 and which is connected between the lever arm 39 and the housing 37 the arrangement being such as to permit slight axial movement at the point of connection with housing 37.

The reference 43 indicates an actuating means which is adapted to move the shaft 40 rectilinearly in response to instructions from a position monitoring means 41 embodied in the gear box 32 (FIG. 2) into and between the gear-change positions of the gear-change fork opposite the actual gear-change stations when the gear-change fork is not engaged in said gear-change stations.

For a more detailed explanation of the subject arrangement and its mode of operation, reference is made to the diagrammatic views illustrated in FIGS. 4–8, showing an embodiment of a gear operating system constructed in accordance with the invention, special reference being made to FIG. 4.

In FIG. 4 the gear lever 21 is shown occupying the first-gear position of the manned unit, the thin lines 21', 21'', and 21''' indicating the position of the lever in some of the other gear positions. The lever 21 is shown, with full lines, fully inserted in the first-gear position. More specifically, the Figure illustrates the positions of the gear lever when it is moved into the gear positions located to the right of a neutral-gear line 44, along which the gear lever can be moved between different positions 45, 46, 47 and 48, i.e., the positions the gear lever takes opposite the actual gear engaging positions before said gear lever is moved into said gear engaging positions. It is evident from this that it is possible to determine and superintend coordinately the gear lever in its different positions along the line 44, a fact on which the invention is based with respect to copying the positioning movements of the gear lever of the manned cab in the remaining gear boxes.

FIG. 4 also shows the gear-change fork housing 35, (see also FIG. 2) in which a gear-change fork is arranged in a known manner for rectilinear and rotary movement and which engages the gear wheels in the gear box 32 (not shown in FIG. 4) in agreement with the gear-changing movements of the gear lever 21.

The shaft 40, having the lever arm 39 secured thereto, is used to effect longitudinal and rotary movement of the gear-change fork. In known gear transmission systems the lever arm 39 is normally movable longitudinally and is adapted to be rotated by means of an intermediate link which, through the intermediary of an arm 49, extending outwardly from the shaft 40, transmits the translatory and rotational movement applied to the link from the shaft 34 of the lever 21 via a further arm 50, which also bends outwardly from the link. Furthermore, in known gear transmission systems, the actual link normally comprises a single rod. The link means of the present invention, which is generally indicated with the reference numeral 38 (see also FIG. 2), is substantially modified in this respect, however, and can generally be considered to comprise a rod divided into separate portions, the main portions of which are shown in the Figure by reference numerals 51 and 52. In the illustrative example, the two portions 51 and 52 are connected together for corotation by means of a claw coupling 53, which also permits the two portions 51 and 52 to be moved longitudinally mutually independently of each other without transmitting translatory movement therebetween.

In the illustrative embodiment there is secured to the link portion 51 a piston 54, while the portion 52 carries a further piston 55. The two link portions 51 and 52 and the pistons 54 and 55 are housed in a piston-cylinder casing 56 which is coordinated with the link means and which presents at respective ends closed piston chambers 57 and 58. The two piston chambers are closed at the outer ends by means of end caps 59 and 60, through which respective link portions 51 and 52 are sealingly slidable. The relative longitudinal movement of the portions 51 and 52 is made possible in the claw coupling 53 through the intermediary of a slide groove 61 and a pin 62 capable of moving along said groove and active to rotate the link portions. Despite the ability of the pistons 54 and 55 to move longitudinally in relation to each other, the pistons are normally — that is when the gear lever 21, 34 is stationary — located at a relatively constant distance apart. Furthermore, the intermediate chamber of the casing 38 is of such length with respect to the claw coupling that the casing 56 can be moved longitudinally on the pistons 54 and 55. The pistons are also individually movable in their piston chambers, to actuate the casing to effect respective longitudinal movements, alternately by direct mechanical actuation and actuation via cushions of pressure medium, suitably air, enclosed in the cylinders 57, 58.

Figure 4A:
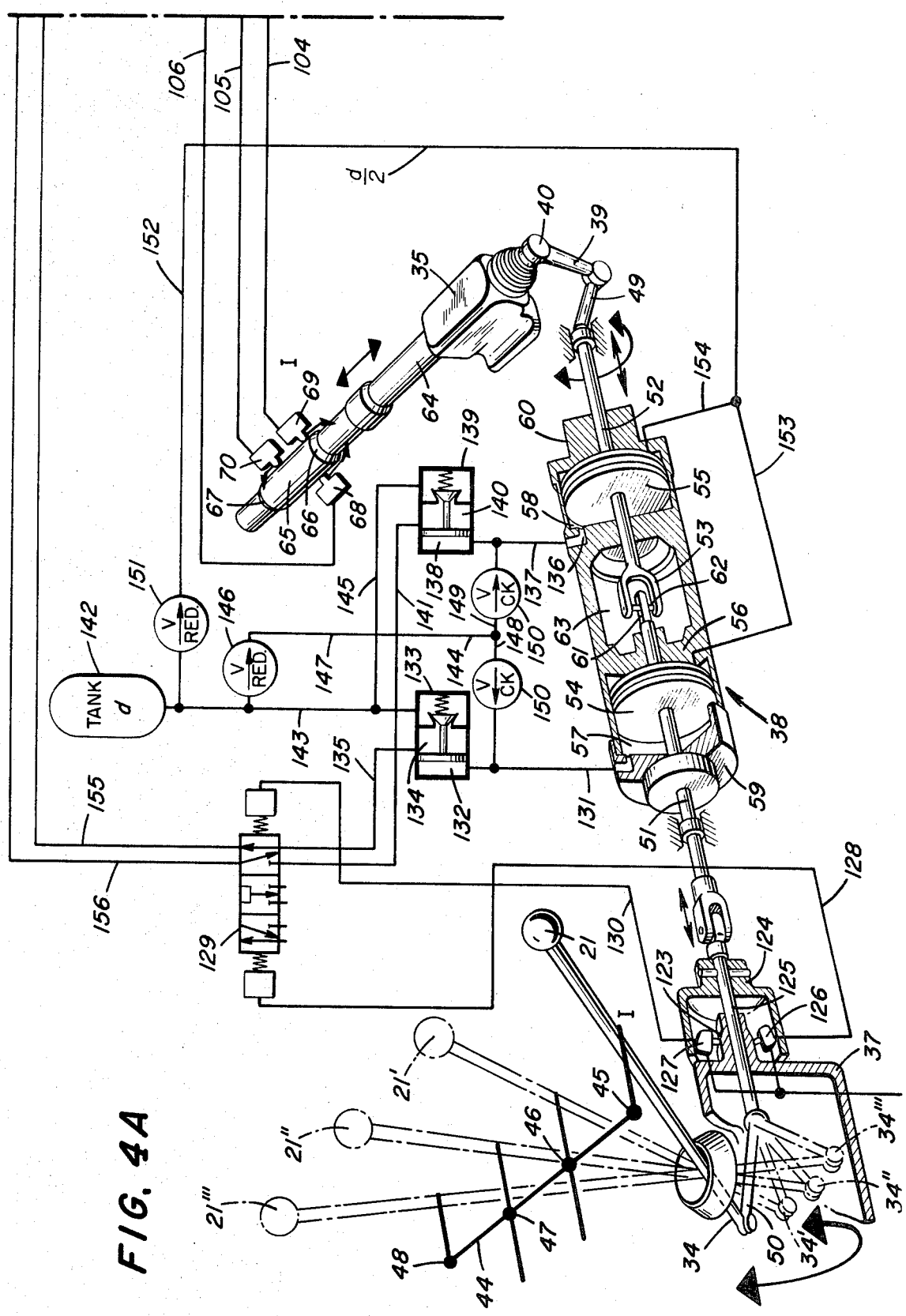

Returning to the gear-Change fork housing 35, seen to the right of FIG. 4A, it should be observed that the shaft 40 of the gear-change fork, in accordance with the invention, is provided with an extension 64 presenting camming means 65, which at one end presents a conical cam surface 66 and at the other end a similar cam surface 67. Cooperating with the two cam surfaces 66, 67 is a number of stationarily arranged micro-switches 68, 69 and 70. It should also be mentioned that these switches are only intended to react to longitudinal movements of the axle extension 64 and not to rotary movements thereof. Owing to the conical construction of the cam surfaces 66 and 67, the position of rotation of the cam surfaces is of no consequence. The switches 68, 69 and 70 are positioned so that their individual, cam-controlled action positions correspond to the position of the gear-change fork, i.e. the positions occupied prior to the forks being turned to take the actual gear engaging positions.

The described cam arrangement and the switches are intended for analyzing the positions taken by the gear lever 21, 34 and the gear-change fork in the gear-change fork housing 35, which thus involves sensing the position to which the gear-change fork is moved longitudinally. The link means 51, 52, characteristic of the invention, and the casing 56 serve to analyze the positions of rotation of the gear-change fork or, more specifically, the position of rotation of its shaft 40, and are also adapted to sense the force with which the gear lever 21, 34 is moved. The arrangement of the invention is intended to enable information concerning the gear-change sequence to be transmitted contemporaneously from the manned unit to all gear transmission units in the train. The diagram of FIG. 4B illustrates suitable means for receiving information and putting the information into effect, which means can be used in accordance with the invention for copying the gear lever movements effected in the manned unit to the gear-change forks in all the gear transmission systems in the subsequent vehicle units.

The diagram of FIG. 4B shows the gear-change fork housing 35 in the engine unit mounted in the vehicle unit immediately following the manned unit, the gear-change fork being representative of all other gear-change forks in the remaining engines forming part of the train. In the illustrative embodiment, the shaft 40 is provided with an extension 71, the outermost end of which is secured to a piston-cylinder housing 72, which is closed by means of a cap 73 screwed thereto. Located within the cylinder 74 is a longitudinally movable piston 75 mounted to a piston rod 76. The piston rod 76 is, in turn, sealingly mounted for longitudinal movement in the cap 73 and is also capable of moving through a cap 77 of a subsequent piston-cylinder arrangement 78, which is completely separate from the cylinder member 72, as indicated by the gap 79. On the opposite end of piston rod 76 is mounted a further piston 80, which is capable of moving longitudinally in its own piston chamber 81 in the piston-cylinder 78, which is divided by a central partition 82. Located on the other side of the partition 82 is further piston 83, which through the intermediary of a piston rod 84 is securely anchored at 85. The end of the cylinder chamber 86 of the piston 83 is closed by means of a cap 87.

The described piston and cylinder arrangements can be actuated and controlled pneumatically, or optionally hydraulically, to cause the shaft 40, via the shaft extension 71, and thereby the gear-change fork in the gear-change fork housing 35, to move longitudinally to the gear-change positions about which information has been received from the sensing means of FIG. 4A. A pressure medium source, generally identified by the reference numeral 88 and which preferably contains air under pressure, is used to actuate the pistons and cylinders in the actuating unit, which acts upon the information received from the sensing means. The total pressure from the source 88 is applied through a pressure line 89, branch line 90 associated with a three-path solenoid valve 92 and a branch line 91 associated with a 5-path solenoid valve 93. The valve 92 can be connected via line 94 to the piston cylinder 86 on the right side of the piston 83, and the valve 93 can be connected via lines 95 and 96, to respective cylinder chambers 81 and 74. A line 97, branching from the source of pressure medium 88, is provided with a reduction valve 98, from which free communication is constantly maintained via lines 99, 100 and branch lines 101, 102 and 103, at a reduced pressure which preferably corresponds to half the total pressure in the source 88, for constantly causing all pistons and piston cylinders to take their starting position. The solenoid valves 92 and 93 arranged to supply pressure medium at the total source or tank pressure are electrically connected through the intermediary of electrical lines 104 and 105 and 106 respectively to the micro-switches 69 and 70 and 68 respectively, whereby respective solenoids are set in the correct open and closing positions with respect to the supply of pressure medium to all those pistons and piston cylinders which, as a result of their longitudinal displacement, move the axle extension 71 to the positions determined for the gear-change fork.

As indicated in the aforegoing, the described arrangements are thus used solely for position setting purposes, i.e., to effect the translatory movements of the gear-change forks in the second and subsequent gear boxes in the train. It requires a further arrangement, however, to also rotate the shaft 40 and thereby turn the gear-change forks to the gear positions about which information is received from the manned unit. The link means generally indicated by the reference numeral 42 and illustrated in FIG. 3 is utilized for this purpose. The link means 42 essentially comprises two coaxially arranged rods 107 and 108. The rod 107 is securely anchored at one end, to the left of the drawing, to a stationary wall or the like 110 by means of a link member or similar member, although with a certain amount of axial play in the region 109. The rod 107 also carries a piston 111 securely connected thereto. The piston 108 is pivotally connected via an outwardly bent angle arm 49 with the arm 39, which serves to rotate the shaft 40 of the gear-change fork. The rod 108 also supports a piston 112, which is securely connected thereto. The pistons 111 and 112 are arranged for individual longitudinal movement in respective piston-cylinder chambers 113 and 114, which are disposed in the ends of a link casing 115, the central portion of which presents a cavity 116. The cylinder chambers 113 and 114 are closed at the ends thereof by means of caps 117 and 118 respectively.

Stationarily arranged within the cavity 116 is a micro-switch 119, adapted to be actuated by the inner end 120 of the rod 107 when it is moved longitudinally in the casing 115. Also arranged in the cavity 116 is a further stationary micro-switch 121, adapted to cooperate with a cam means 122 which is secured to the inner end of the rod 108.

Reference is now made to the manned unit shown in FIG. 4A, where a stationary cam means 123 is arranged on the outside of the housing 37. The cam means 123 is surrounded by a cover member 124 which is secured to a rod portion 125 connected to the outwardly bent arm 50. Arranged for slight axial movement in the cover member 124 are two micro-switches 126 and 127, said two switches being of different construction, in so far as the switch 127 closes the current when depressed while the switch 126 breaks the current when depressed. Movement of the rod 125 when changing gears and thus movement of the cover member 124 and the switches 126 and 127, cause one switch to be immediately energized and the other to be immediately deenergized, in dependence on the position of axial movement between the sensing means of the switches and the cam means 123. When the gear lever 21, 34 takes a position along the line 44, the current through both micro-switches 126 and 127 is completely broken.

The switch 126 is electrically connected via an electric line 128 with the left hand side of a diagrammatically illustrated fine-path solenoid valve 129. At the same time, the micro-switch 127 is connected by an electrical line 130 to the right hand side of the same solenoid 129. Embodied in the left cylinder chamber 57 of the link member 38, is a cushion of compressible medium, normally air, the chamber communicating through a line 131 with the left side 132 of a relay valve 133, the right side 134 of which is connected via a line 135 with the solenoid valve 129. Further the right cylinder chamber 58 of the link casing 56 embodies a second cushion of compressible medium, which communicates via a passage 136 and a line 137 with the left side 138 of a relay valve, generally indicated at 139, the right side 140 of which is connected, via a line 141, with the solenoid valve 129. The relay valve 133 communicates with a source of pressure medium or tank 142 via a supply line 143 and a branch line 144. In turn, the relay valve 139 communicates with the same source of pressure medium 142, via a branch line 145 and the line 143. The two pressure lines 131 and 137 communicate furthermore, with the source of pressure medium 142 via a reduction valve 146 and the lines 147, 148 and 149, respectively, in which two latter lines are embodied non-return valves 150, which prevent flow from the cylinders 57 and 58 in relation towards the source of pressure medium 142.

The source of pressure medium 142 also communicates, via a reduction valve 151, the line 152 and the line 153, with the cylinder chamber 57 on the right side of the piston 54, and similarly the pressure medium source 142 communicates, via the reduction valve 151, a line 152 and the branch line 154, with the cylinder chamber 58 on the right side of the piston.

Passing from the solenoid valve 129 to the left side of the piston-cylinder chamber 133 in the link member 42 of the gear operating unit is a pressure line 155, as illustrated in FIGS. 4A and B. A third pressure line 156 passes from the solenoid valve 129 to the left side of the piston-cylinder chamber 114 in the link member 42.

The right hand portion of the cylinder chamber 113 communicates with the pressure medium source 88 via the reduction valve 98, the line 99 and a further branch line 157, from which latter line 157 a line 158 is branched which passes to the right side of the piston 112 in the cylinder chamber 114. A further branch 159 passes to the right side of the piston 111 in the cylinder chamber 113.

For the purpose of protecting the gear boxes in the subsequent units, in the event that the gear positions selected in such units are not fully correct, there is arranged in accordance with the invention between the clutch pedal of the manned vehicle and subsequent vehicles a line 160 for air under pressure, in which is embodied a free-path solenoid valve 161, this latter valve being adapted to de-clutch at non-gear engaging positions. Furthermore, incorporated in the pressure medium line 155 is a fluid pressure actuated electrical switching means 162, and in the pressure medium line 156 a fluid pressure actuated electrical switching means 163. The means 162 is connected by an electrical line 164 to the micro-switch 119 in the link member 42, while the switching means 163 is connected via the line 165 to the micro-switch 121. The micro-switches 119 and 112 are supplied with current from a feed line via branch lines 166 and 167. The line 164 is connected with the line 165 at the junction 169, from where a line 170 passes to the solenoid valve 161 and a line 171 to a warning lamp 172, normally situated in the cab of the manned unit and which, when ignited, warns that the gear or gears in subsequent vehicle units are not in the correct gear position.

Returning to FIG. 4A, it should be observed that the reduction valve 151 is adapted to reduce the total pressure from the pressure medium source 142 suitably to half its pressure, and that this "half-pressure" is applied to the right hand side of the pistons 54 and 55. The reduction valve 146 is set to a pressure which constantly exceeds the reduction pressure from the reduction valve 151. The air from the reduction valve 146 passes via the non-return valves 150 and is caused to act against the left pressure surfaces of the pistons 54 and 55. As a result of said pressure differential, the pistons are constantly moved to the right in their cylinder chambers, when seen in the drawing. The pressure generated by the reduction valve 146 is then maintained constant in the chambers 132 and 138 and the relay valves 133 and 139. This means that the same pressure is maintained in the lines 135 and 141, which pressure, depending upon the setting of solenoid 129, is propagated to respective cylinder chambers 113 and 114, in FIG. 4B. When the gear lever is in a neutral position along the line 44, the valve 129 blocks the air pressure from relay valves 133 and 139 and at the same time evacuates the lines 155 and 156.

The manner in which the invention functions will now be described with special reference to FIG. 4A and B. If it is assumed that the gear lever 21, 34 in FIG. 4 is in a neutral position on the line 44, then all current through the micro-switches 126 and 127 is broken, which means that the solenoid valve 129 blocks the lines 135 and 141, but on the other hand allows the pressure medium to flow in the lines 155 and 156. If the gear lever 21, 34 is moved from neutral position, for example to the right so as to take the first-gear position, as shown in the Figure, the cover member 124 with the micro-switches 126 and 127 will be moved towards the cam member 123. The micro-switch 127 then passes current to the right side of the solenoid valve 129, while current is still prevented from flowing through the switch 126 through the left side of the solenoid valve 129. This in turn means that the pressure chamber 134 of the relay valve 133 is brought into communication, via the solenoid valve 129, with the cylinder chamber 113 in the unit of FIG. 4B, more specifically with the left side of the piston 111. This means that the casing of link means 42 is moved to the left in the Figure. The arm 39 in the same unit is then actuated so that it rotates the gear-change fork in the housing 35 to gear position I, i.e., the same gear position occupied by the gear lever 21, 34. This course of events takes place each time the gear lever 21, 34 is moved to the line 44 to its gear positions indicated by the reference numerals 21', 21'' and 21'''. This also means that the solenoid valve 129 in all said gear positions has the same setting, as given in the Figure, as will be seen from FIGS. 5 and 6 which represent the gear position III and the reversed gear position.

Figure 7:
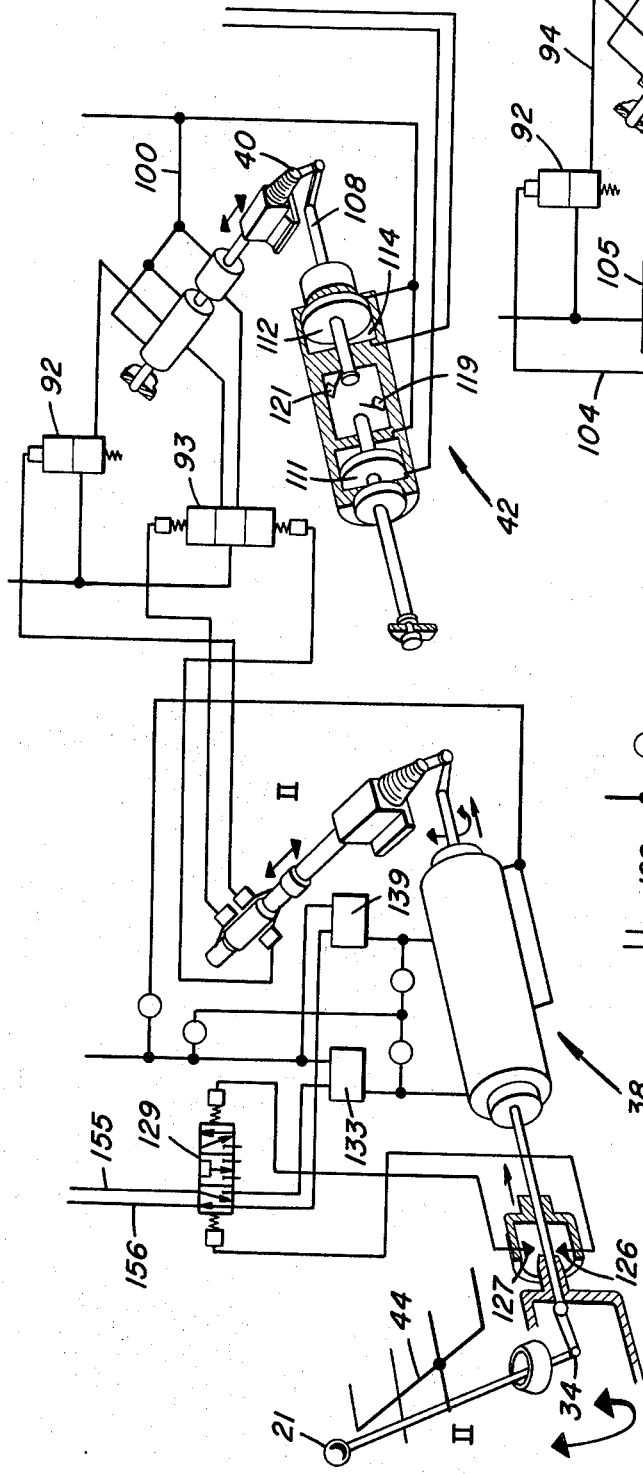
FIG. 7 shows the same layout as FIG. 6 but with the gear lever in the second-gear position, while finally
Figure 8:
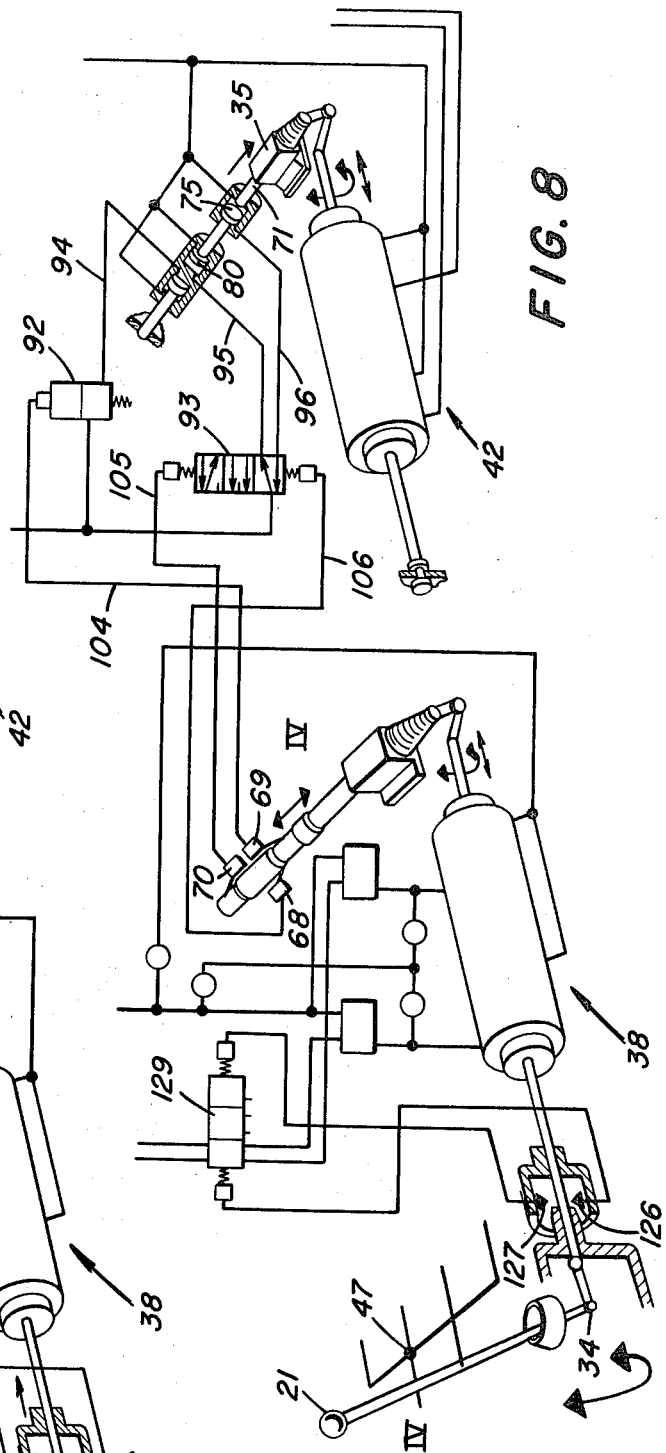
FIG. 8 shows the same layout as FIG. 7 with the gear lever placed in the fourth-gear position.

If, on the other hand, the gear lever is moved to the left into any of the gear positions II or IV, as shown in FIGS. 7 and 8, the micro-switch 127 will prevent current from flowing to the right side of the solenoid valve 129, while the micro-switch 126 opens the connection with the left side of said solenoid. This means that the pressure in the chamber 134 of the relay valve 133 is blocked by the solenoid valve 129, while instead communication is maintained between the chamber 140, via the solenoid valve 129, and the left side of the piston 112 in the cylinder 114 in subsequent vehicle units. The rod 108 then turns the arm 39, and thus also the shaft 40, counter clockwise so that the gear takes the same gear position as that represented by the position of the gear lever 21, 34, to the left of line 44. The same is true for FIG. 8, where the gear lever 21, 34 is inserted in its fourth-gear position, indicated by IV.

If a relatively large resistance is met with when inserting the gear, the cushion of air enclosed in the cylinder chamber 57 will be compressed when for example, inserting the gear lever in the first-gear position, by movement of the piston 54 to the left. Consequently, the pressure in the chamber 132 in relay valve 133 is, of course, also increased. The non-return valve 150 closes so that no air can pass towards the reduction valve 146. Because the pressure in the chamber 132 in the relay valve 133 increases, the valve is reversed so that air under pressure from the pressure air source 142 flows, via the lines 143 and 144, into the chamber 134 until a balanced pressure is obtained in the valve 133. The pressure in the chamber 132 and the chamber 134 is then equal. The throughflowing air then passes through the valve 129 to the cylinder 113, thereby moving the casing 42 to the left (as seen in the Figure), which means that the gears in subsequent units are drawn in with the same force as that taken to insert the gear in the manned vehicle unit. While this sequence is taken place, the line 156 is evacuated of air, so that the cylinder 114 on the left side of the piston 112 is entirely void of pressure. The pressure from the reduction valve 98 then holds the piston 112 constantly pressed against the left wall of the chamber. When selecting the gear in the position to the left of line 44, the relay valve 139 will act in exactly the same manner as the valve 133, although the solenoid valve 129, as shown in FIGS. 7 and 8, is set so that the piston 112 is now instead moved to the right in the cylinder 114.

The aforedescribed function of the arrangement of the invention only clarifies what takes place when the gear lever and all gear-change forks are moved or rotated into their correct gear engaging positions. It is also necessary, however, to reproduce in the gear transmission systems of subsequent vehicle units the positional setting of the gear lever and the gear-change forks in the gear transmission system of the manned unit, i.e., the positions taken by the gear lever and gear-change fork opposite the actual gear engaging positions, but in neutral position represented by the line 44. The extended shaft 64 of the gear-change fork in the manned unit together with the cam member 65 and cam surfaces 66 and 67, which coact with the micro-switches 68, 69 and 70, serve this purpose.

FIG. 4 illustrates the micro-switches 70 in an energized position, the line 105 being energized and having set the solenoid valve 93 in such a position that air under pressure from the line 89 is passed, via the line 91 and 96, to the left side of the piston 75, which in this way has moved the shaft extension 71 to the left, as seen in the Figure. All pistons 75, 80 and 83 are actuated by the reduced pressure from the reduction valve 98, which pressure should constitute half the total pressure in the pressure medium source 88. When the valves 92 and 93 are deenergized the pistons are unloaded through lines 101, 102, 103 and held constantly in a starting position. The line 95 to the piston 80 is also evacuated of air, as is also the line 94, through the valve 92. When the gear lever 21, 34, e.g., as shown in FIG. 5, is moved to the position 46, all micro-switches 68, 69 and 70 are deenergized and the valve 93 is thereby set to a neutral position and the lines 94, 95 and 96 evacuated of air. The pressure in the line 100 thereby forces all pistons to take up the neutral position shown in the Figure. The reduced pressure in line 100 — half the tank or source pressure - holds the pistons constantly in a starting position, which is represented by the position 46.

FIG. 6 illustrates the conditions when inserting the gear lever 21, 34 into the reverse-gear position. In this instance the micro-switch 70 breaks the current and no current passes through the line 105 to the upper side of the solenoid valve 93. The micro-switches 68, 69, on the other hand, are energized and thus pass electric current to the lines 104 and 106. The solenoid valve 93 is then set so that air under pressure passes through the line 95 to the left side of the piston 80, the same side of piston 75 being evacuated of air through the line 96. The solenoid valve 92 passes air through the line 94 to the right side of the piston 83. The gear-change forks in all gear boxes have then reached their outermost position.

The conditions shown in FIG. 7 are the same as those in FIG. 5.

With regard to the position 47 of the gear lever 21, 34 illustrated in FIG. 8, the micro-switch 68 delivers current to the lower portion of the solenoid valve 93, while the switches 69 and 70 are completely deenergized. This means that air under pressure passes through the line 95 to the left side of the piston 80, so that the piston 80 is moved to the right, as seen in the Figure, and actuates the extension 71 to the right, via an air cushion located before the piston 75. Thus, the gear-change fork in the housing 35 has also been moved to the position 47 opposite the fourth gear engaging position IV.

The invention is not restricted to the shown and described embodiment, but can be varied within the scope of the following claims.

What is claimed is:

1. A gear change mechanism in a train of wheeled pivotally connected vehicle units, each driven by its individual engine, clutch means, gear box and gear shifting means, one of said vehicle units being a manned unit and subsequent vehicle units being unmanned comprising:
   a. first sensing means to sense rotary movement of the manned unit gear shifting means, second sensing means to sense translatory movement of the manned unit gear shifting means, and means to control the gear shifting means of an unmanned vehicle unit to cause it to copy the sensed motions;
   b. means to sense the force applied to the translatory movement of the manned unit gear shifting means and copy that force in an unmanned unit comprising a pressure medium system means connected to the gear shifting means of the manned vehicle and the gear shifting means of an unmanned vehicle, a mechanical link member in the manned unit for transmitting the push and pull movement of the gear shifting means, said link member incorporating a cylinder for pulling movement and a cylinder for pushing movement; similar link members and cylinders in an unmanned unit; a relay valve having a closed side communicating with a cylinder in the manned unit and another side interposed between a source of pressure medium and the remainder of the pressure medium system; means connecting said pressure source with the cylinders in the unmanned unit so that a force applied to the gear shifting means of the manned unit will cause a change in the pressure in the unmanned unit cylinders.

2. The mechanism of claim 1 in which each unmanned unit shifting means has a secondary piston assembly to actuate the gear shifting means to effect movements between preparatory gear shift positions; cam means on the manned unit gear shifting means, switches actuated by said cam means, an electric circuit actuated by said switches connected to a solenoid valve for controlling a supply of pressure medium to said secondary piston assembly; a further piston assembly in said similar cylinder to effect gear engaging movements of the gear shifting means, the mechanical link in the manned unit having two generally co-axial parts mounted for limited lost motion longitudinal movement and coupled rotary movement, each part being connected to a piston in said cylinder, said cylinders being securely connected together; said relay valve being connected to a multi-path solenoid valve controlled by the gear shift lever, said multi-path valve being connected to the further piston assembly in the unmanned unit.

3. The mechanism of claim 2 in which the switches are micro-switches and the secondary piston assembly is an adjustable pressure medium actuator having an associated pressure medium source connected thereto via adjustable solenoid valve means controlled by said micro-switches.

4. The mechanism of claim 3 in which the manned unit gear shifting means has a gear fork shaft provided with cam means in the form of annular abutment faces which extend concentrically with said shaft and terminate with conical surfaces.

5. The mechanism of claim 4 in which said cam means are arranged on an extension of the gear fork shaft of the gear shifting means.

6. The mechanism of claim 3 in which the secondary piston assembly comprises a plurality of pistons and cylinders, the pistons on a first pressure side thereof being constantly subjected to a reduced pressure and means to subject the opposite sides of the pistons alternately to evacuation of air and a non-reduced pressure in response to the setting of the solenoid valve.

7. The mechanism of claim 6 in which the reduced pressure is approximately one half the total source pressure.

8. The mechanism of claim 2 in which the gear shifting means of an unmanned unit has a gear change fork shaft connected to a lever, means to move said lever to rotate said shaft, a piston rod having a first part connected to said lever and a second part fastened to a stationary attachment permitting axial play, a piston on each piston rod part, each piston mounted for operation in said similar cylinder, the cylinder being connected together in spaced relationship with the piston rod parts axially moveable in relation to each other.

9. The mechanism of claim 3 in which the pistons in both the manned and unmanned units are constantly subjected on a first pressure side to a reduced pressure of approximately one half the total pressure and on the opposite side in the manned unit are subjected, when in rest position, to a pressure slightly higher than said reduced pressure.

10. The mechanism of claim 9 in which each piston having higher pressure therein communicates with one side of its relay valve while the other side thereof communicates from the pressure medium source to the solenoid valve, adjusted by the gear shift lever.

11. The mechanism of claim 10 including means whereby the solenoid valve is adjustable by sensing means in response to movement of the gear shifting means and means connecting the solenoid valve to the cylinder of all unmanned units, the solenoid valve being reversible to alternately subject the cylinders to pressure and evacuation.

12. The mechanism of claim 11 in which each relay valve is provided with a balancing means capable of balancing the pressure in the cylinders caused by the gear lever against the pressure in the pressure medium system upon effecting the gear shifting movements.

13. The mechanism of claim 1 having a piston in each said cylinder with the pressure medium being admitted on the sides of the piston facing in the same direction, the cylinders being moveable in relation to said pistons and mechanical link member.

* * * * *